Figure 1:
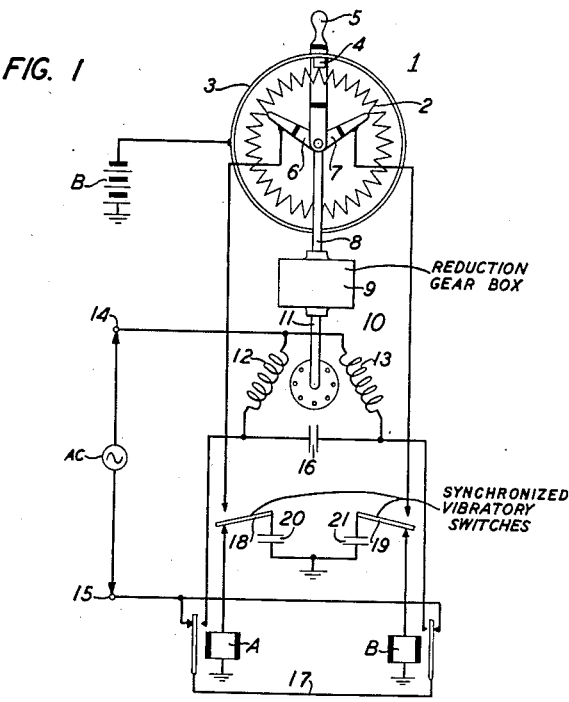

Aug. 22, 1950

W. KOENIG, JR 2,519,667

MOTOR CONTROL CIRCUIT

Filed May 16, 1945

INVENTOR
W. KOENIG, JR.
BY
P. C. Smith
ATTORNEY

Patented Aug. 22, 1950

2,519,667

UNITED STATES PATENT OFFICE 2,519,667

MOTOR CONTROL CIRCUIT

Walter Koenig, Jr., Clifton, N. J., assignor to Bell Telephone Laboratories, Incorporated, New York, N. Y., a corporation of New York Application May 16, 1945, Serial No. 594,064

9 Claims. (Cl. 318—28)

This invention relates to a motor control circuit and more particularly to a control circuit in which relays responsive to a control signal are effective to cause the operation of a motor in one or the other direction of rotation and at a speed commensurate with the magnitude of a control signal.

It is the object of the invention to provide a motor control circuit which will enable a motor to drive any desired apparatus accurately into a position which corresponds to the position assumed by a remote control device.

In accordance with the invention the foregoing object is attained by the provision of two relays the period of operation of one of which relays may be changed with respect to the period of operation of the other relay whereby the split phase windings of an alternating current motor are connected to a source of single phase alternating current in such a manner as to cause the motor to run in one or the other direction dependent upon the direction of change in the operation periods of the relays and at a speed determined by the magnitude of the change.

More specifically the operating periods of the two relays are determined by the periodic connection of the windings of the two relays into the separate discharge paths of two equal condensers. The armatures of the two relays are interconnected, their back contacts are both connected to one terminal of a power source of alternating current and their front contacts are connected respectively through the two windings of a split phase alternating current motor to the other terminal of the source of alternating current. With the motor thus connected if the two condensers are equally charged and the two relays thus operate and release together no circuit is established from the power source through the motor and the motor will not operate. If, however, one relay should be operated by the discharge of its associated condenser for a longer interval than the second relay is operated by the discharge of its associated condenser due to the condensers having been charged unequally, circuits will be established through the windings of the motor over the front contact of the first relay and over the back contact of the second relay whereby the motor is caused to turn in one direction. The speed to which the motor will attain will be determined by the length of the impulses transmitted therethrough as measured by the length of the periods the first relay remains operated after the second relay has released. If the second relay remains operated for an interval after the first relay releases the motor is then caused to turn in the other direction and at a speed determined by the length of the impulses transmitted therethrough as measured by the length of the periods the second relay remains operated after the first relay has released.

The condensers are simultaneously and periodically switched from their discharge circuits to charging circuits under the control of periodically operable switches. The charging circuits extend to two sliders driven by the motor which engage a potentiometer winding. Also engageable with the potentiometer winding is a third slider operable either manually or otherwise to a position representative of a signal condition. This slider has a source of direct current connectable thereto.

When the circuit is in a balanced condition with the signal slider positioned on the potentiometer winding in a position so that equal portions of the potentiometer winding are included between its point of engagement and the points of engagement of the motor operated sliders with the potentiometer winding, the condensers will receive equal charges upon each establishment of their charging circuits. If, however, the signal slider is positioned nearer to one motor operated slider than to the other motor operated slider, one condenser will receive a greater charge than the other upon each establishment of the charging circuit and as a consequence the motor will be operated until the sliders driven thereby are so positioned with respect to the signal slider that the condensers receive equal charges at which time the motor will stop. The motor will then have set any desired apparatus into a position representative of the position given to the signal slider.

It is to be understood that the invention is not to be considered as limited to the specific means disclosed for causing the control relays to be operated for unequal intervals in response to a control signal or as limited to the control of a specific type of motor. For example, the motor could be of the series-connected split field type operable from a source of direct current.

Figure 2:
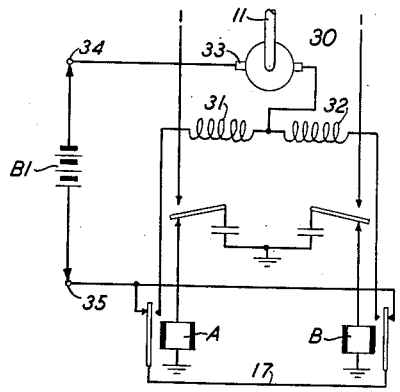

For a clearer understanding of the invention reference may be had to the following detailed description when read in connection with the accompanying drawing in which:

Fig. 1 shows the invention as embodying the control of an alternating current motor of the split phase type; and Fig. 2 shows the invention as embodying the control of a direct current motor of the series-connected split field type.

Referring first to Fig. 1, a motor control device is disclosed at 1 which comprises an arcuately disposed potentiometer winding 2, a slip ring 3 concentrically disposed with respect to the winding 2, a slider 4 carried by the setting arm 5 and conductively engaged with the slip ring 3 and with the potentiometer winding 2, and two sliders 6 and 7 insulatedly secured to the shaft 8 and engageable with the potentiometer winding 2. The slip ring 3 is connected to one terminal of a battery B the other terminal of which is connected to ground.

The arm 5 may be operated by any suitable means. For example it may be rotated in either direction continuously at either a uniform or a non-uniform speed or may be operated alternately in one direction and then in the opposite direction.

The shaft 8 is rotatable through the reduction gear box 9 by the motor 10, the rotor of which motor is mounted on the shaft 11 entering the input side of the gear box. The motor 10 is of the split phase type and has two phase windings 12 and 13 each connected by one terminal to the terminal 14 of the source of single phase alternating current AC and having their other terminals interconnected through the condenser 16 and connected respectively with the front contacts of relays A and B. The back contacts of the relays are both connected to the terminal 15 of the alternating current source AC and the armatures of the relays are interconnected by conductor 17.

The relays A and B are preferably of the reed armature mercury contact type disclosed in the application of E. T. Burton, Serial No. 545,896, filed July 21, 1944, now Patent No. 2,445,406. It is to be understood, however, that relays of other types could be used if such relays are sensitive and fast in operation and capable of handling current of considerable wattage transmitted over their contacts. Each of these relays comprises an envelope of glass or other suitable material through the bottom of which an armature terminal is sealed and through the top of which two other terminals are sealed. Secured to the inner end of one of the upper terminals is a front contact of magnetic material and secured to the inner end of the other upper terminal is a back contact of non-magnetic material. Secured to the lower terminal by a reed is an armature of magnetic material which is normally biased against the back contact and is attractable toward the front contact. A pool of mercury is placed in the bottom of the envelope from which mercury is conducted to the contacts by wick action. Surrounding the envelope is an operating coil or winding which, when energized, sets up a flow of magnetic flux through the armature and the front contact to cause the movement of the armature toward the front contact.

The relay A has an operating circuit extending from ground through its winding, over switch 18 in its lower contact position and through the condenser 20 to ground whereby the relay A is operated by the discharge current from the condenser 20, and relay B has a similar operating circuit extending from ground through its winding, over switch 19 in its lower contact position and through the condenser 21 to ground whereby the relay B is operated by the discharge current from the condenser 21.

A charging path for condenser 20 extends from ground through such condenser, over switch 18 in its upper contact position, over slider 6 and the portion of the potentiometer winding 2 between the slider 6 and slider 4 and thence over the slider 4 and slip ring 3 to battery B. A similar charging path for condenser 21 extends from ground through such condenser, over switch 19 in its upper contact position, over slider 7 and the portion of the potentiometer winding 2 between the slider 7 and the slider 4 and thence over the slider 4 and slip ring 3 to battery B.

The switches 18 and 19 are vibratable in unison by any suitable operating means whereby the switches spend approximately two milliseconds during each cycle in their upper contact closure positions during which intervals the condensers 20 and 21 are charged, and spend approximately 15 milliseconds during each cycle in their lower contact closure positions during which interval the condensers discharge through the windings of relays A and B.

With the setting arm 5 in the position shown, in which the slider 4 is in the mid-position between the sliders 6 and 7, each time that the switches 18 and 19 are operated to their upper positions the condensers 20 and 21 will receive equal charges from the battery B and upon each operation of the switches to their lower positions the equally charged condensers will discharge through the windings of relays A and B. Since the switches 18 and 19 start the discharging of the condensers at the same instant, the relays A and B will both operate together and since the charges in the condensers are equal the charges will both become dissipated through the relay windings at the same rate and relays A and B will therefore release together. With relays A and B both operated simultaneously and released simultaneously no effective circuit is established for connecting the source of power AC to the motor 10 and the motor will therefore not operate.

If now the setting arm 5 is moved in a counter-clockwise direction the current which will flow from the battery B over the portion of the potentiometer winding 2 between the sliders 4 and 6 to charge the condenser 20 each time that switch 18 moves to its upper contact position, will be increased and the current which will flow from the battery B over the portion of the potentiometer winding 2 between the sliders 4 and 7 to charge the condenser 21 each time that the switch 19 moves to its upper contact position will be decreased. As a consequence the condenser 20 will receive a greater charge than the condenser 21 upon each closure of the switches 18 and 19 to their upper positions.

When, therefore, following each condenser charging interval, the switches 18 and 19 move to their lower positions, relays A and B will be operated simultaneously in response to the discharging of the condensers 20 and 21 but due to the greater charge in condenser 20 relay A will continue to be operated by the discharge current from condenser 20 after the charge in condenser 21 has been completely dissipated and relay B has therefore released. Therefore during each interval that relay A remains operated following the release of relay B a circuit is established from terminal 15 of the power source AC over the back contact of relay B, over conductor 17, over the front contact of relay A, through the winding 12 of motor 10 and in parallel therewith through condenser 16 and winding 13 of the motor to terminal 14 of the power source AC. The motor will thereby receive an impulse of power of a duration measured by the interval during which relay A remains operated following the release of relay B and the motor in response to recurring impulses thus transmitted will rotate in one direction. Since the extent of movement of the arm 5 will determine the magnitude of the difference in the charges which condensers 20 and 21 will receive and thereby the length of the intervals during which relay A will remain operated after relay B releases, the duration of the impulses delivered to the motor will be determined by the extent of the movement of setting arm 5 and the motor 10 will therefore attain a speed commensurate with such movement.

As the motor runs the shaft 8 is driven at a reduced speed from the motor shaft 11 through the reduction gear box 9 to turn the sliders 6 and 7 in a counter-clockwise direction, thereby gradually increasing the resistance included in the charging circuit of condenser 20 and reducing the resistance in the charging circuit of condenser 21 and therefore gradually reducing the difference between the charges given to the condensers and reducing the length of the intervals during which relay A remains operated after relay B releases resulting in the slowing down of the motor 10. When the sliders 6 and 7 have been moved to positions on the potentiometer winding 2 in which equal resistances are again included in the charging circuits of condensers 20 and 21, the condensers will receive equal charges resulting in relays A and B remaining operated for equal and identical intervals at which time the motor 10 will receive no further driving impulses and will come to rest.

If now the setting arm 5 is moved in a clockwise direction the resistance included in the charging circuit of condenser 20 will be increased and the resistance included in the charging circuit of condenser 21 will be reduced resulting in condenser 21 receiving a greater charge than condenser 20 upon each operation of the switches 18 and 19 to their upper positions and also resulting in relay B remaining operated following the release of relay A each time that the switches 18 and 19 move to their lower positions to establish the discharge circuits of the condensers through the windings of the relays.

Each time that relay B remains operated after relay A releases, a circuit is established from terminal 15 of the power source AC, over the back contact of relay A, over conductor 17, over the front contact of relay B, through the winding 13 of motor 10 and in parallel therewith through condenser 16 and winding 12 of the motor to terminal 14 of the power source. As a consequence the motor 10 is now operated in the opposite direction by the impulses transmitted thereto and will cause the sliders 6 and 7 to be moved in a clockwise direction until the control circuit again becomes balanced as previously described.

As disclosed in Fig. 2 a series-connected split field direct current motor 30 may be controlled by the relays A and B in the same manner as above described by connecting the outside terminals of the two field windings 31 and 32 to the front contacts of the relays A and B, respectively, by connecting the brush 33 of the motor to one terminal 34 of the source of direct current power represented by the battery B1, by connecting the other brush of the motor to the junction point between the field windings 31 and 32, and by connecting the other terminal 35 of the power source to the back contacts of the relays. With the motor thus connected it will be driven in one direction of rotation by impulses transmitted through the field winding 31 and the armature circuit of the motor each time that relay A remains operated following the release of relay B and will be driven in the opposite direction of rotation by impulses transmitted through the field winding 32 and the armature circuit of the motor each time that relay B remains operated following the release of relay A.

From the foregoing it will be apparent that the motor will accurately follow the movement of the setting arm 5 regardless of how irregular such movement may be.

What is claimed is:

1. In a motor control system, two relays each having an operating winding and a set of transfer contacts, means for causing said relays to operate simultaneously and to thereafter remain operated for variable periods of time, means for changing the relationship between operated periods of said relays, a reversible motor having two stator windings, a source of power, and a circuit extending serially over contacts of both of said relays when either one of said relays is operated and the other of said relays is unoperated for connecting one or the other of said windings to said source of power whereby said motor is caused to run in a direction determined by the direction of said change and at a speed determined by the magnitude of the change.

2. In a motor control system, two relays each having an operating winding and a set of transfer contacts, means for causing said relays to operate simultaneously, means for varying the periods during which said relays remain operated whereby said relays may release simultaneously or successively, a reversible motor having two stator windings, a source of power, and a circuit extending serially over contacts of both of said relays when said relays release successively for connecting one or the other of said windings to said source of power dependent upon which of said relays releases first, whereby said motor is caused to run in one or the other direction and at a speed determined by the length of time one of said relays remains operated after the other has released.

3. In a motor control system, two relays each having an operating winding and a set of transfer contacts, means for causing said relays to operate simultaneously and to thereafter remain operated for variable periods of time, means for changing the relationship between the operated periods of said relays, a reversible split phase alternating current motor having two stator windings, a source of single phase alternating current, and a circuit extending serially over contacts of both of said relays when either one of said relays is operated and the other of said relays is unoperated for connecting one or the other of said stator windings to said source whereby said motor is caused to run in a direction determined by the direction of said change and at any speed determined by the magnitude of the change.

4. In a motor control system, two relays each having an operating winding and a set of transfer contacts, means for causing said relays to operate simultaneously and to thereafter remain operated for variable periods of time, means for changing the relationship between the operated periods of said relays, a reversible series connected split field direct current motor having two field windings, a source of direct current, and a circuit extending serially over contacts of both of said relays when either one of said relays is operated and the other of said relays is unoperated for connecting one or the other of said field windings to said source, whereby said rotor is caused to run in a direction determined by the direction of said change and at a speed determined by the magnitude of the change.

5. In a motor control system, a source of direct current, two control condensers, two relays, means for alternately initiating the simultaneous charging of said condensers from said source of current and for initiating the simultaneous discharge of such condensers through the windings of said relays, a control device for determining the amount of charge each of said condensers shall receive and thereby the length of time each of said relays will be maintained operated by the discharge currents from said condensers, a reversible motor having two stator windings, a source of power, and circuits controlled when either one of said relays is operated and the other of said relays is unoperated for connecting one or the other of said windings to said source of power dependent upon which of said relays has the shorter operation period, whereby said motor is caused to run in one or the other direction and at a speed determined by the difference in the operated periods of said relays.

6. In a motor control system, a source of direct current, two control condensers, two relays, periodically operated means for alternately initiating the simultaneous charging of said condensers from said source of current and for initiating the simultaneous discharge of said condensers through the windings of said relays, a control device for determining the amount of charge each of said condensers shall receive and thereby the length of time each of said relays will be maintained operated by the discharge currents from said condensers, a reversible motor having two stator windings, a source of power, and circuits controlled when either one of said relays is operated and the other of said relays is unoperated for connecting one or the other of said windings to said source of power dependent upon which of said relays has the longer operated period, whereby said motor is caused to run in one or the other direction and at a speed determined by the difference in the operated periods of said relays.

7. In a motor control system, a source of direct current, two control condensers, two relays, periodically operated means for alternately initiating the simultaneous charging of said condensers from said source of current and for initiating the simultaneous discharge of said condensers through the windings of said relays, a control device settable to cause said condensers to be unequally charged during each charging period whereby said relays will be maintained operated by the discharge currents from said condensers for different periods, a reversible motor having two stator windings, a source of power, and circuits controlled when either one of said relays remains operated following the release of the other of said relays for connecting one or the other of said windings to said source of power dependent upon which of said relays has the longer operated period, whereby said motor is caused to run in one or the other direction and at a speed determined by the difference in the operated periods of said relays.

8. In a motor control system, a source of direct current, two control condensers, two relays, periodically operated means for alternately initiating the simultaneous charging of said condensers from said source of current and for initiating the simultaneous discharge of said condensers through the windings of said relays, a control device settable to cause said condensers to be unequally charged during each charging period, whereby said relays will be maintained operated for different periods by the discharge currents from said condensers, a reversible motor having two stator windings, a source of power, circuits controlled when either one of said relays remains operated following the release of the other of said relays for connecting one or the other of said windings to said source of power dependent upon which of said relays has the longer operated period, whereby said motor is caused to run in one or the other direction and at a speed determined by the difference in the operated periods of said relays, and means controlled by said motor for restoring said control device to a condition in which both of said condensers receive equal charges thereby resulting in the arresting of the operation of said motor.

9. In a motor control system, a source of direct current, two control condensers, two relays, periodically operated means for alternately initiating the simultaneous charging of said condensers from said source of current and for initiating the simultaneous discharge of said condensers through the windings of said relays, a potentiometer having a control slider and two motor operated balancing sliders interposed in the charging circuits of said condensers, whereby when said control slider is positioned unsymmetrically with respect to said balancing sliders said condensers become unequally charged during each charging period and whereby said relays will be maintained operated for different periods by the discharge currents from said condensers, a reversible motor having two stator windings, a source of power, circuits controlled when either one of said relays remains operated following the release of the other of said relays for connecting one or the other of said windings through said source of power dependent upon which of said relays has the longer operated period, whereby said motor is caused to run in one or the other direction at a speed determined by the difference in the operated periods of said relays, and means controlled by said motor for moving the balancing sliders of said potentiometer into symmetrical positions with respect to said control slider resulting in said condensers receiving equal charges to operate said relays for equal periods whereupon said motor is stopped.

WALTER KOENIG, Jr.

REFERENCES CITED

The following references are of record in the file of this patent:

UNITED STATES PATENTS

| Number | Name | Date |
|---|---|---|
| 2,088,659 | Moseley | Aug. 3, 1937 |
| 2,167,484 | Berry | July 25, 1939 |
| 2,331,698 | Keeler | Oct. 12, 1943 |
| 2,462,913 | Sorensen | Mar. 1, 1949 |